(12) United States Patent
Balan et al.

(10) Patent No.: US 7,440,497 B2
(45) Date of Patent: Oct. 21, 2008

(54) SERIAL DATA LINK USING DECISION FEEDBACK EQUALIZATION

(75) Inventors: Vishnu Balan, San Jose, CA (US); Joseph Caroselli, Jr., Palo Alto, CA (US); Ye Liu, San Jose, CA (US); Chintan M. Desai, San Jose, CA (US); Jenn-Gang Chern, Redwood City, CA (US)

(73) Assignee: LSI Corporation, Milpitas, CA (US)

( * ) Notice: Subject to any disclaimer, the term of this patent is extended or adjusted under 35 U.S.C. 154(b) by 638 days.

(21) Appl. No.: 10/978,755

(22) Filed: Nov. 1, 2004

(65) Prior Publication Data

US 2006/0093028 A1    May 4, 2006

(51) Int. Cl.
    *H03H 7/03*    (2006.01)
(52) U.S. Cl. .................. 375/229; 375/233; 375/296; 375/316; 375/348; 375/346; 455/63.1; 455/114.2; 455/296
(58) Field of Classification Search .................. 375/229, 375/316, 295, 233, 348, 346, 296; 455/63.1, 455/114.2, 296
See application file for complete search history.

(56) References Cited

U.S. PATENT DOCUMENTS

| | | | |
|---|---|---|---|
| 5,519,727 A | 5/1996 | Okanoue et al. ............ 375/232 |
| 5,594,756 A * | 1/1997 | Sakurai et al. ............... 375/233 |
| 5,946,351 A | 8/1999 | Ariyavisitakul et al. ..... 375/233 |
| 6,317,495 B1 | 11/2001 | Gaikwad et al. ............ 379/417 |
| 6,324,220 B1 * | 11/2001 | Sellars ....................... 375/296 |
| 6,538,451 B1 | 3/2003 | Galli et al. .................. 324/533 |
| 6,782,043 B1 | 8/2004 | Dehghan et al. ............ 375/224 |
| 7,050,517 B1 * | 5/2006 | Sallaway et al. ............ 375/350 |
| 2001/0043647 A1 | 11/2001 | Belge ......................... 375/222 |
| 2001/0043650 A1 * | 11/2001 | Sommore et al. ........... 375/232 |
| 2002/0008777 A1 * | 1/2002 | Ovadia et al. ............... 348/470 |
| 2003/0058959 A1 * | 3/2003 | Rafie et al. .................. 375/296 |
| 2003/0108096 A1 * | 6/2003 | Steinbach ................... 375/229 |

OTHER PUBLICATIONS

"A 0.13- μm CMOS 5-Gb/s 10-meter 28AWG cable transceiver with no-feedback-loop continuous-time post-equalizer" by Youshiharu Kudoh, Muneo Fukaishi, and Masayuki Mizuno, *Symposium on VLSI Circuits Digest of Technical Papers*, 2002.
"A 1.0625 Gbps transceiver with 2X-oversampling and transmit signal pre-emphasis", bu Alan Fiedler, Ross Mactaggart, James Welch, and Shoba Krishnan, *ISSCC*, vol. XL, pp. 238, Feb. 1997.
"A 5Gb/s 0.25 μm CMOS Jitter-tolerant variable-interval over-sampling clock/Data recovery circuit", by Sang-Hyun Lee Moon-Sang Hwang et al., *ISSCC*, vol. XLV, pp. 256, Feb. 2002.
"A 4.8-6.4 Gbps Serial Link for Back-plane Applications using Decision Feedback Equalization" by Vishnu Balan et al., *IEEE Custom Integrated Circuits Conference*, 2004.

* cited by examiner

*Primary Examiner*—Mohammad Ghayour
*Assistant Examiner*—Leila Malek
(74) *Attorney, Agent, or Firm*—Westman Champlin & Kelly, P.A.

(57) ABSTRACT

A multi-phase adaptive decision feedback equalizer minimizes post-cursor inter-symbol interference in a current data bit based on values of subsequent data bits in a data communication system. In one form, the receiver includes a plurality of modules each having a respective adaptive decision feedback equalizer. A processor responsive to output signals from each of the plurality of modules generates a plurality of coefficient values. The adaptive decision feedback equalizer has a plurality of taps receiving a respective output signal from one of the modules and a respective coefficient value to generate a respective correction signal. The correction signals are summed with the data signal and processed to recover the data. Pre-calculation of coefficients permits rapid selection of data. Multi-phase operation permits higher data frequencies.

11 Claims, 4 Drawing Sheets

SERIAL DATA LINK USING DECISION FEEDBACK EQUALIZATION

FIELD OF THE INVENTION

This invention is directed to data communications, and particularly to serial data links between a transmitting unit and a receiving unit.

BACKGROUND OF THE INVENTION

Reference is made to the article "A 4.8-6.4 Gbps Serial Link for Back-plane Applications using Decision Feedback Equalization" by the same inventors identified herein, published at Proceedings of the IEEE 2004 Custom Integrated Circuits Conference, pages 31-34, October 2004, the content of which is hereby incorporated by reference in its entirety.

Copper traces on printed circuit boards (PCBs) are used as data channels to transmit digital data from a transmitting unit to a receiving unit on the PCB. These traces exhibit several loss mechanisms that degrade the data signal and generate inter-symbol interference (ISI) between data bits in a data string or bit stream. These loss mechanisms include skin effect, dielectric loss, and reflections from impedance discontinuities in the traces. These losses increase as data communication speeds increase. ISI increases with increased data speeds, resulting in increased bit error rates (BERs) and degradation of clock signals recovered from received data.

Advanced equalization techniques are employed to reduce ISI and recover data and clock from the data stream at the receiver. Some designs implement pre-emphasis to increase high-frequency gain of the transmitted signal to compensate for increased high-frequency losses though the channel. Other designs employ linear equalizers, such as finite impulse response (FIR) filters, to boost the high-frequency signals in the receiver. Yet other designs employ both transmitter pre-emphasis and receiver equalization. However, these techniques also boost high frequency noise and cross-talk, which can degrade performance. Moreover, cross-talk, which is already greater at higher frequencies, gets worse due to high frequency boost from the transmitter pre-emphasis and by the equalizer at the receiver.

An improved equalization technique is illustrated in FIG. 1, and employs a decision feedback equalizer (DFE) at the receiver that removes post-cursor ISI due to channel losses by feeding back decisions that are clean. As shown in FIG. 1, data transmitted by transmitter 10 are received from data channel 12 by receiver 14. Data, which may be distorted due to loss mechanisms in channel 12, are received by a forward equalizer 16. Forward equalizer 16 conditions the received signal by adjusting the signal gain so that the signal amplitude of data signals forwarded to summing device 18 is substantially constant. Data slicer 20 provides decisions to DFE 22 to supply a signal to summing device to cancel inter-symbol interference caused by the most recently processed bits from the presently received bit. An adaptive loop drives forward equalizer 16 and DFE 22 for optimal settings for given channel loss characteristics.

Data slicer 20 is timed by the clock recovered from the output data to provide clean decisions ±1 in the case of binary non-return to zero (NRZ) signaling. The decisions are fed back to DFE 22 to minimize ISI in subsequent bits. More particularly, the output from slicer 20 is applied to a voltage-controlled oscillator loop (not shown) to recover the clock signal in a well-known manner. The filter coefficients of forward equalizer 16 and DFE 22 are driven by the adaptation loop and set according to the most optimal settings for given channel loss characteristics that result in the lowest BER. In PCB applications, a target BER of $10^{-15}$ is typical.

The DFE system shown in FIG. 1 minimizes BER loss without boosting noise or cross-talk to achieve signal equalization. However, the system uses previous decisions to cancel ISI in the present bit. Consequently, the system is vulnerable to error-propagation.

The DFE system shown in FIG. 1 must be linear over the entire operating range of the circuit. Forward equalizer 16 requires considerable power to operate in a linear mode over a wide high frequency range. Thus, power limitations at the receiver end of channel 12 effectively eliminate implementation of the DFE system of FIG. 1 in PCBs and integrated circuit (IC) chips for wide high frequency ranges, such as at frequencies of 4.8 to 6.4 gigabits per second (Gbps). There is a need, therefore, for a data transmission system that is linear over a high frequency range and that does not require considerable power at the receiver.

SUMMARY OF THE INVENTION

In a first embodiment of the invention, a data communication apparatus is provided, such as on a printed circuit board or integrated circuit chip. The apparatus comprises a transmitter capable of transmitting data in the form of a data signal representing a string of binary data bits with at least two distinct amplitudes. A programmable feed-forward equalizer minimizes pre-cursor inter-symbol interference in the data signal. A data channel transmits the data signal to a receiver that receives the data signal. A multi-phase adaptive decision feedback equalizer at the receiver minimizes post-cursor inter-symbol interference in a current data bit of the received data signal based on values of subsequent data bits.

In preferred embodiments, the receiver comprises a plurality of modules, each providing an output during a respective clock phase. An adaptive decision feedback equalizer in each module modifies the data signal received from the channel based on the output signals of the plurality of modules.

In some embodiments, each adaptive decision feedback equalizer has a plurality of taps responsive to respective module output signals and a respective coefficient value to generate respective correction signals, and a summing device modifies the data signal based on the plurality of correction signals. The number of taps in each adaptive decision feedback equalizer is based on a number of bits causing post-cursive inter-symbol interference in a data bit in the string.

Optionally, the taps are arranged in pairs using pre-calculated coefficients with a selection of the modified data signal performed on the basis of a subsequent bit value.

Another embodiment of the invention is directed to a process of transmitting data over a data channel between a transmitting circuit and a utilization circuit wherein a decision feedback equalizer is adapted to minimize post-cursor inter-symbol interference in a bit in the received data signal based on a bit value of a subsequent bit in the received data signal.

DETAILED DESCRIPTION OF THE PREFERRED EMBODIMENTS

Figure 2:
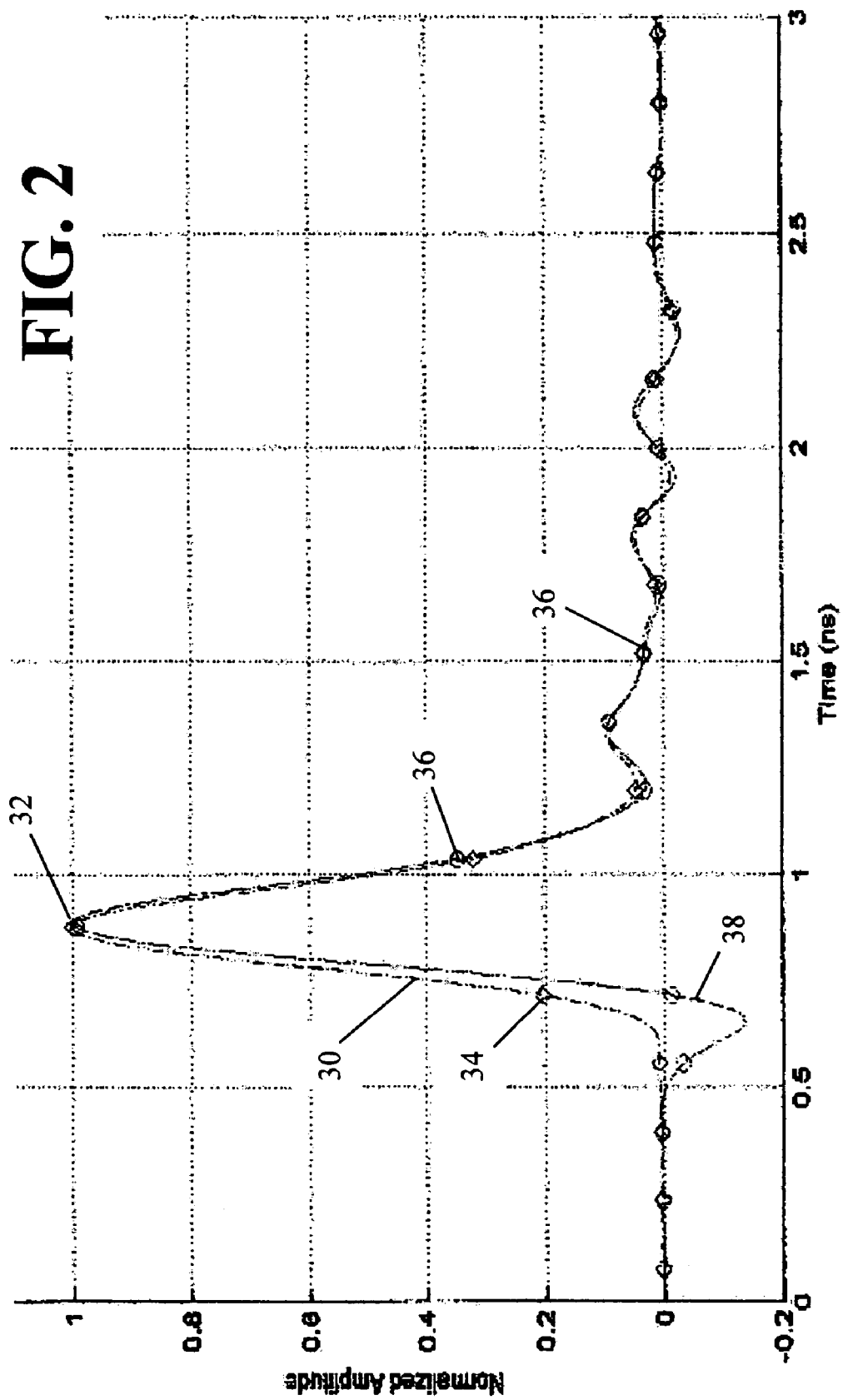
FIG. 2 is a graph demonstrating the effects of a pre-emphasis filter according to the present invention.

FIG. 2 illustrates a typical pulse response for transmission of a binary '1', preceded and followed by long series of 0's. The data points on the graph are spaced one bit period apart and represent sampling points. Curve 30 denotes the pulse response without pre-cursor feed forward equalization. Peak 32 demarcates the sampling position for the single '1'. Data points 34 that precede peak 32 with non-zero magnitude represent pre-cursor inter-symbol interference that will interfere with previously transmitted bits. Data points 36 that follow peak 32 with non-zero magnitude represent post-cursor ISI and represent noise to subsequently transmitted bits. The goal of the present invention is to remove as much ISI as possible while minimizing cross talk enhancement. This is accomplished by use of a programmable feed forward equalization filter 24 and an adaptive decision feedback equalizer 22 shown in FIG. 3.

Figure 3:
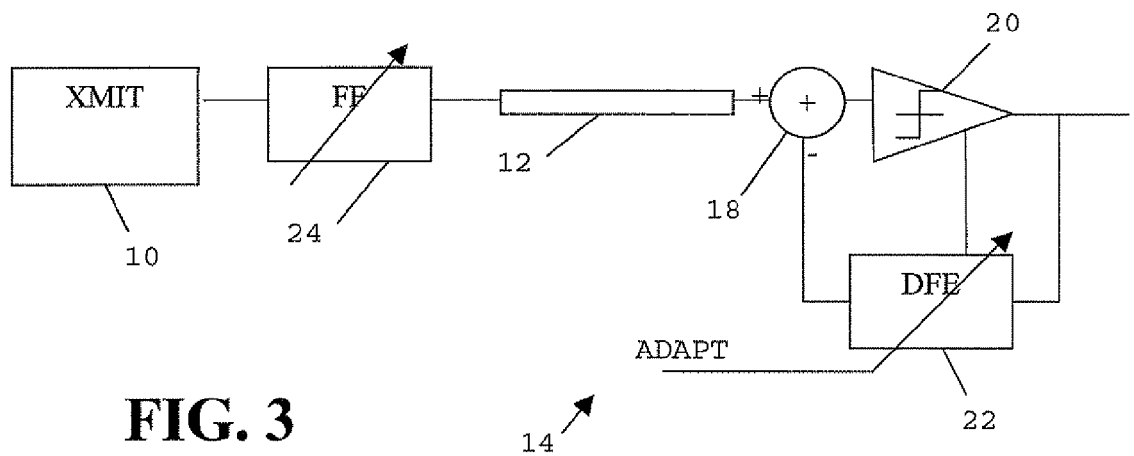
FIG. 3 is a block diagram of data transmission system employing an adaptive decision feedback equalizer according to an embodiment of the present invention.

In a first embodiment of the invention, shown in FIG. 3, the function of forward emphasis filter 16 of the prior art system is moved to the transmitter side of channel 12. This is possible because both channel 12 and the filter are linear systems and their order can be swapped. However, since the adaptive loop is not available to the filter in the transmitter side, a programmable forward de-emphasis filter 24 is substituted for the adaptive forward equalizer filter of the prior art system. As a de-emphasis filter, filter 24 operates on known data and is easier to design. It also ensures backward compatibility with legacy systems at half-rate or quarter-rate modes. Thus, the embodiment shown in FIG. 3 employs a programmable forward de-emphasis filter 24 at the transmitter side of channel 12, and a fully adaptive decision feedback equalizer 22 at the receiver side of channel 12.

In preferred embodiments, feed forward equalizer 24 is a finite impulse response (FIR) filter having some number of taps. The number of taps on equalizer 24 is empirically selected based on the number of significant pre-cursor ISI samples in the pulse response. The pulse response in FIG. 2 shows only one significant sample 34 of pre-cursor ISI, implying that a two-tap FIR filter would be adequate for the feed-forward equalizer.

Figure 4:
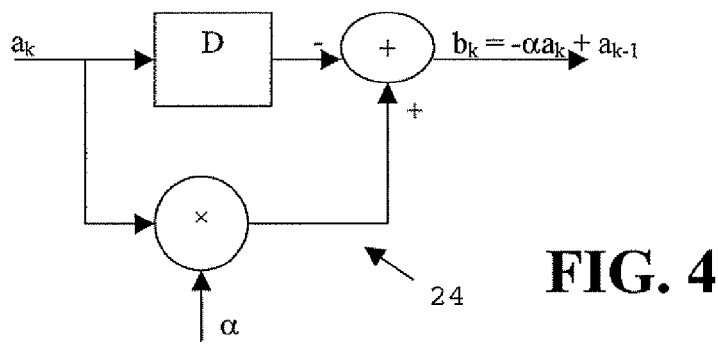
FIG. 4 is a functional diagram of an embodiment of a transmitter forward filter shown in FIG. 3.

FIG. 4 illustrates the transfer function of a two tap FIR transmit filter 24. For input $a_k$, and delay D, the transfer function is $-\alpha+D$ and the output is $b_k=-\alpha a_k+a_{k-1}$. Application of filter 24 adjusts the pulse response to curve 38 in FIG. 2.

Data slicer 20 in FIG. 3 makes decisions each bit period, T, during which the decision feedback equalizer filter 22 processes the information to cancel ISI from the present incoming symbol. In order to cancel ISI from the present bit based on the most recent bit, the following timing constraint must be observed:

$$T_{ck\text{-}Q}+T_{delay\_DFE}+T_{setup} \leq T \quad (1)$$

where, $T_{ck\text{-}Q}$ is the clock-to-data delay of the slicer, $T_{delay\_DFE}$ is the delay of filter 22, and $T_{setup}$ is the setup time of the slicer. In 0.13 µm CMOS technology and for operation at 6.4 Gbps (gigabits per second), T=156.25 ps (picoseconds). This timing constraint may be eased by storing results of a pre-calculation of every possible combination of the previous bit (in parallel) to cancel ISI and then making a choice once the data are known. The stored pre-calculation results ease the requirement for high power at the receiver in some applications.

In the present invention, it is desired to perform as much of the equalization as possible at the receiver end of channel 12. Decision feedback equalizer 22 is adaptive and does not enhance high frequency cross talk. Decision feedback equalizer 22 is capable of removing post-cursor ISI, but not the pre-cursor ISI. Consequently, feed forward equalizer 24 at the transmitter end of channel 22 is used to mitigate the pre-cursor ISI.

In preferred embodiments, the receiver employs a multi-phase clocking scheme. In one embodiment, shown in FIG. 5, a four-phase design employs four modules 40, 42, 44 and 46 each operating to provide an output D0, . . . , D3 during a respective phase ($\phi_i$, i=3, . . . , 0). Each phase provides a pulse whose duty cycle is 4T in duration. Pulse transitions are offset by T from two other clock phases. This four-phase design allows a lower frequency (¼ f) for each phase and permits use of a low power/area ring voltage-controlled oscillator 48 to generate the clock pulses for phases $\phi_3, \ldots, \phi_0$. Thus, for a 6.4 GHz clock rate, each phase operates at 1.6 GHz. This design makes it easier to distribute the clock on-chip. Baud-rate sampling is used to capture the data as well as generate error signals for driving the timing, gain and coefficient adaptation loops. The equalized data eye is sampled in the center with a 2-bit analog-to-digital converter to generate an error signal, E, and data signal, D.

Figure 1:
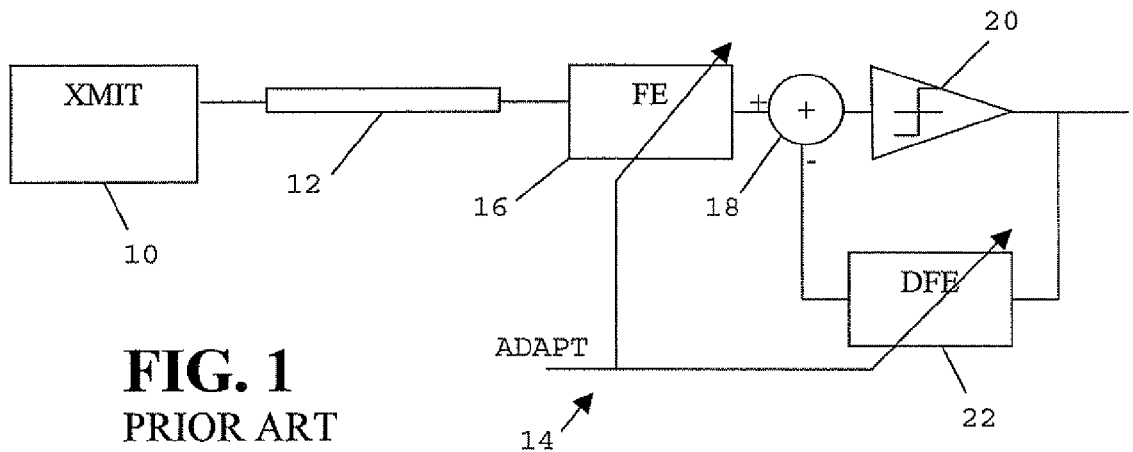
FIG. 1 is a block diagram of data transmission system employing a conventional adaptive decision feedback equalizer.
Figure 5:
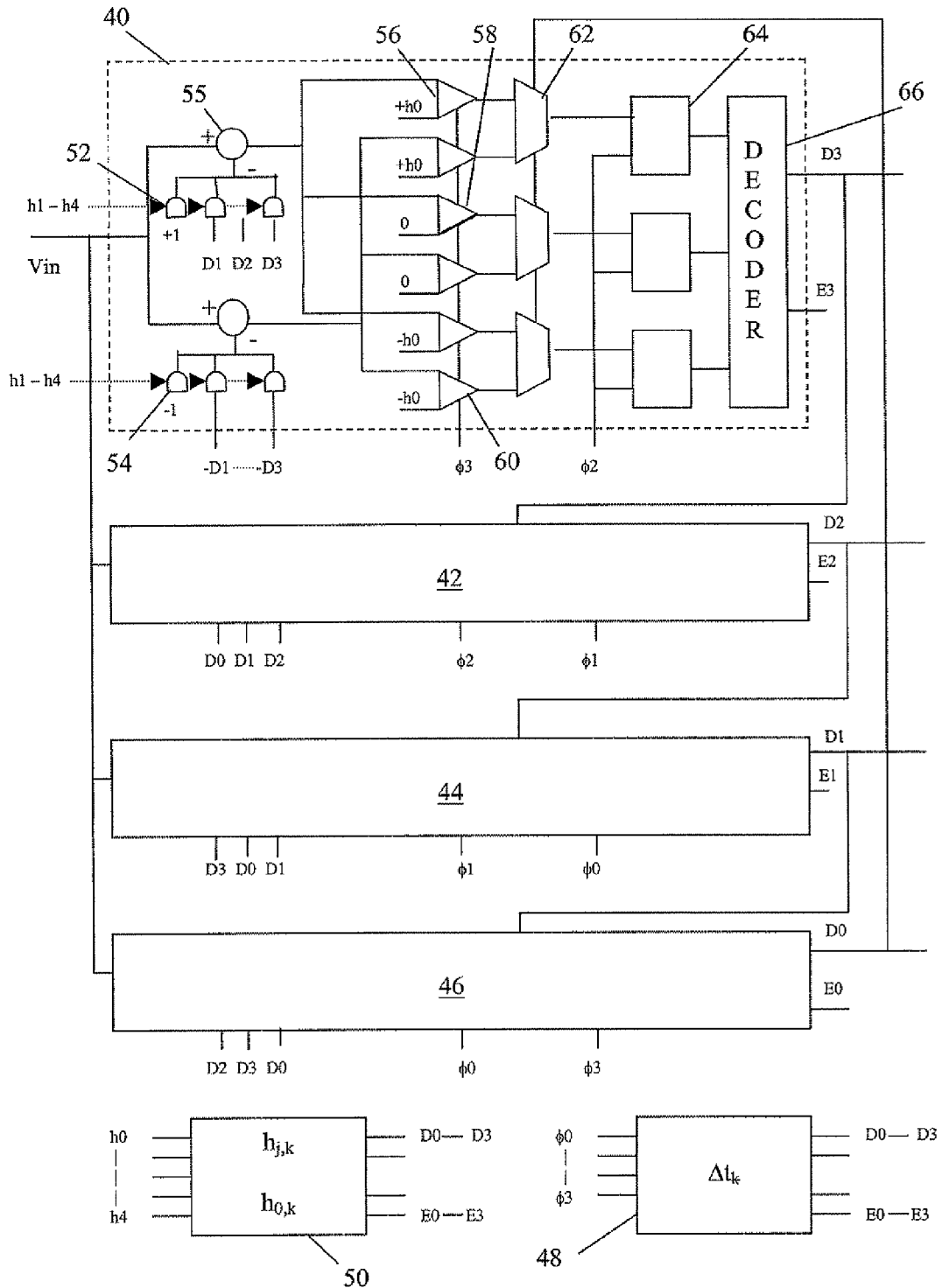
FIG. 5 is a block diagram of a pre-emphasis filter according to an embodiment of the present invention.

In the prior art decision feedback filter system shown in FIG. 1, the adaptive forward equalizer filter 16 controls the gain of the incoming signal such that the amplitude seen by the analog-to-digital converter is constant, that is, filter 16 provides automatic gain control. In the present invention, since the function of filter 16 is at the transmitter in the form of filter 24, a "gain loop" is employed at the receiver to adjust the size of the least significant bit in the data slicer, which in FIG. 5 is a two-bit data slicer.

As the incoming amplitude changes from one channel to another or as a result of transmitter broadcast amplitude settings, the target amplitude, $h_0$, internal to the receiver changes until it reaches steady state. A large incoming amplitude will cause a higher $h_0$, and vice-versa. This can be represented by the following equation:

$$Vin_k - \Sigma h_n \cdot \hat{D}_i = \pm h_0, \quad (2)$$

where $Vin_k$ is the $k^{th}$ sample of $Vin$, $h_n$ are filter coefficients for the decision feedback equalizer, $\hat{D}_{k-n}$ is the detected data and $h_0$ is the target amplitude, which is the same as the threshold for the data slicer. A coefficient adaptation loop adjusts $h_n$ and a gain loop adjusts $h_0$. In the embodiment of FIG. 5, the coefficient adaptation loop and gain loop operate together to satisfy equation (2) for every sample.

The coefficient feedback loop employs a plurality of feedback equalization taps, the number of which is based on an analysis of the pulse response. Conveniently, the number of phases of the multi-phase clock is equal to the number of taps of the coefficient adaptation loop. As is seen in the pulse response of FIG. 2, post-cursor ISI trails off more slowly compared to pre-cursor ISI.

We have found that four taps provide adequate performance. While performance continues to improve as the number of feedback taps increases, any additional taps provide only marginal benefit and do not justify the additional cost in complexity and power to the circuit. Consequently, the 4-tap, 4-phase feedback equalizer shown in FIG. 5 is preferred.

As shown in FIG. 5, and particularly in module 40, each of the four taps in each module 40, . . . , 46 comprises a pair of multipliers comprising one multiplier 52 and one multiplier 54. In each module, one tap is formed by a multiplier 52 receiving a value of +1 and a multiplier 54 receiving a value of −1. The value ±1 represents the value of the next bit, which in the case of module 40 is D0. The other three taps receive the bit values of the next three bits, which in the case of module 40 are ±D1, ±D2 and ±D3, respectively. Thus, multipliers 52 receive +1, +D1, +D2 and +D3, whereas multipliers 54 receive −1, −D1, −D2 and −D3. The multiplier pairs representing each tap multiply the values of the respective signals by a coefficient $h_1$, $h_2$, $h_3$ and $h_4$, respectively.

Figure 6:
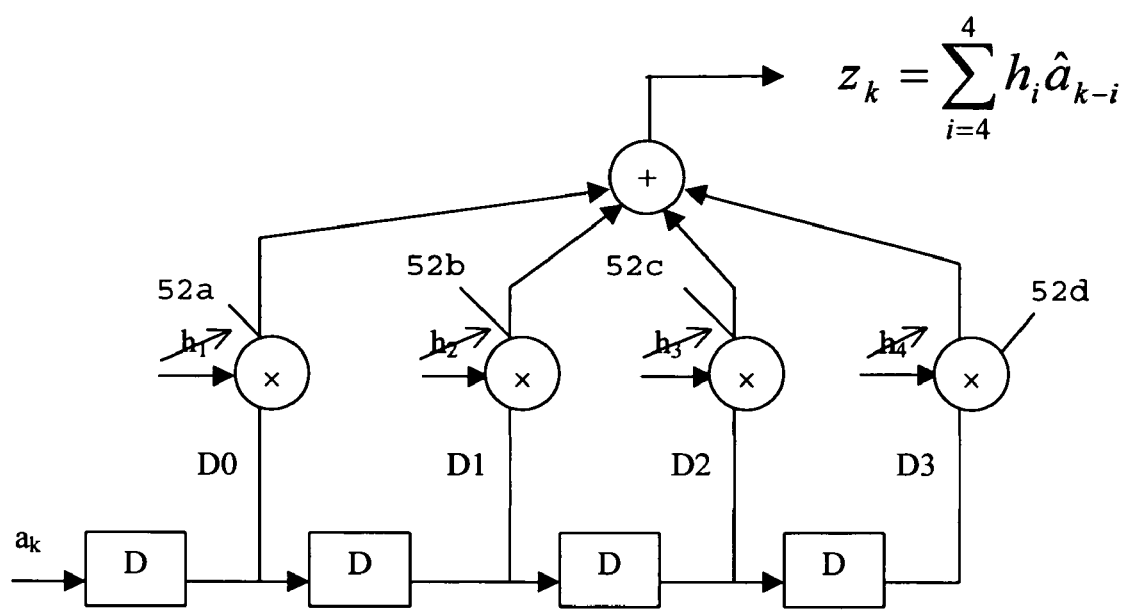
FIG. 6 is a functional diagram of the pre-emphasis filter shown in FIG. 5.

FIG. 6 is a functional diagram of one of the sets of multipliers 52 or 54, such as multipliers 52 of module 40 in FIG. 5. The other set of multipliers is similar. The input signal $\hat{\alpha}_k$ is the succession of signals D0, . . . , D3 which are delayed from each other by a delay D, representing bit period T. Each signal D0, . . . , D3 is applied a respective multiplier 52a, . . . , 52d, which in turn multiplies the signal by a coefficient $h_1$, . . . , $h_4$. The result is summed to provide a signal, $z_k$. For four taps, the output of the feedback equalizer will be $$z_k = \sum_{j=1}^{4} h_{j,k} \hat{D}_{k-j} \quad (3)$$

where, $\hat{D}_k$ is the detected data bit at time k and $h_{j,k}$ is the value of the $j^{th}$ tap of the feedback equalizer at time k. The output of the feedback equalizer is subtracted from the received signal sample, $Vin_k$, the input to the slicer is:

$$y_k = Vin_k - z_k = Vin_k - \sum_{j=1}^{4} h_{j,k} \hat{D}_{k-j}. \quad (4)$$

Multipliers 52 and 54 provide pre-calculation of coefficients. The value of a coefficient may be either positive or negative, depending on the value of the data bits. The value ±1 is applied for the next bit (D0 in module 40). Multiplier 52a multiplies +1 by coefficient $h_1$ (corresponding multiplier 54a multiplies −1 by coefficient $h_1$). In this manner, the tap outputs ±1·$h_1$ to the respective summing devices 55. Similarly, multipliers 52b and 54b forming the next tap output ±D1$h_2$ (module 40) to summing devices 55, and so on. Multipliers 52 collectively calculate the value of +$z_k$ that is subtracted from the input $Vin_k$. Multipliers 54 collectively calculate the value of −$z_k$ that is subtracted from $Vin_k$.

The equalizer taps are set adaptively by processor 50 which receives the data and error outputs D0, . . . , D3 and E0, . . . , E3. The error signal E that drives this loop is the sign of the difference between the input and the output of the slicer, $E_k$=sign($\hat{D}_k h_{0,k}$−y), where $h_{0,k}$ is the ideal value of the received sample estimated at time k. The feedback equalizer taps use the error signal in a sign-sign least mean squares (LMS) algorithm to adapt the equalizer taps each 4T time period as:

$$h_{j,k} = h_{j,k-4} - \mu_h \Delta h_{j,k} \quad (5)$$

where $$\Delta h_{j,k} = \text{sign}\left(\sum_{i=1}^{4} \text{sign}(E_{k-i} \cdot \hat{D}_{k-i-j})\right)$$

and $\mu_h$ is a scale factor that determines the bandwidth of the feedback tap adaptation.

The error signal depends on the comparison of the received signal with the ideal signal level, which can vary depending on the voltage swing of the transmitted signal as well as the quality of the channel. The level of the ideal signal level is adapted automatically each 4T as $$h_{0,k} = h_{0,k-4} - \mu_\gamma \Delta h_{0,k}, \quad (6)$$

where $$\Delta h_{0,k} = \text{sign}\left(\sum_{i=1}^{4} \text{sign}(E_{k-i} \cdot \hat{D}_{k-i})\right)$$

and $\mu_\gamma$ is a scale factor that controls the bandwidth of the ideal signal level adaptation.

Processor 50 in FIG. 5 receives the error and data signals from modules 40, . . . , 46 to calculate the values of $h_1$, $h_2$, $h_3$, $h_4$ from equation (5) and the value of $h_0$ from equation (6). The values of $h_1$, . . . , $h_4$ are applied to multipliers 52 and 54 for the "coefficient adaptation" loop and the value of $h_0$ is applied to data slicers 56 for the "gain" loop.

The two values of the summed input, $y_k$, are applied to respective data slicers 56, 58 and 60. The data slicers are arranged in pairs, with one slicer 56, 58, 60 of each pair being connected to the input summed with multipliers 52 and the other slicer 56, 58, 60 of each pair being connected to the input summed with multipliers 54. The pair of slicers 56 operate with a target value of +$h_0$, the pair of slicers 58 operate with a target value of 0 and the pair of slicers 60 operate with a target value of −$h_0$. The pairs of slicers 56, 58, 60 are coupled to respective selectors 62 which are operated by output of the prior data bit, D0 in the case of module 40, to select one of the pre-calculated sets of coefficients to output the selected data slices to an analog-to-digital converter formed of respective flip-flops 64 and decoder 66. Decoder 66 provides data and error signal outputs, which are used to adaptively adjust coefficients $h_0$, . . . , $h_4$ and generate the phase definitions $\phi_3$, . . . , $\phi_0$.

The $\phi_3$, . . . , $\phi_0$ phase signals generated by oscillator 48 drive data slicers 56, 58, 60 and flip-flops 64 in each module. Selectors 62 are timed by the data signal from the next module. Considering module 40 in FIG. 5, data slicers 56, 58 and 60 are enabled during the $\phi_3$ phase to provide outputs to selectors 62 based on ±$z_k$ and ±$h_0$ or 0. Selectors 62 are enabled by the D0 data signal, which was generated during the same $\phi_3$ phase. Hence, selectors 62 select three values from the six data slicers based on either +$z_k$ or −$z_k$ and ±$h_0$ or 0. The selection is based on the value of D0. The selected values operate respective flip-flops 64 and are decoded by decoder 66 to supply D3 data and E3 error signals to oscillator 48 and processor 50 and to supply data D3 to the user circuit.

At phase $\phi_2$, which is immediately before the next phase $\phi_3$, flip-flops 64 are reset in readiness for the next cycle. Modules 42, 44 and 46 are operated in the same manner with the data slicers being operated during phase $\phi_2$ and flip-flops reset during phase $\phi_1$ (module 42), during phases $\phi_1$ and $\phi_0$ (module 44) and during phases $\phi_0$ and $\phi_3$ (module 46).

Thus, the output of each flip-flop 64 is the output of a selected data slicer 56, 58 60. The flip-flops latch and hold the output for a period of 4T, with each decoder 66 supplying the output to the other modules. Thus the D3 output feeding into the respective taps 52, 54 of module 40 is actually the D3 output from 4T ago and is used to cancel ISI from the present bit. Similarly, the D2 output from module 42 feeding into taps of module 40 is the D2 output from 2T ago.

Phase update is driven by baud rate spaced samples. To accommodate large frequency offsets without severely impacting jitter tolerance performance, a second order timing loop is employed in oscillator 48 to generate a phase update term $$\Delta t_k = \text{sign}(\Sigma \text{sign}(E_{k-1} \cdot \hat{D}_{k-1-i} - e_{k-1-i} \cdot \hat{D}_{k-i})) \qquad (7)$$

The sampling position is updated each 4T as $t_k = t_{k-4} - \mu_t \Delta t_k - \Delta f_k$, where $\Delta f_k = \Delta f_{k-4} - \mu_f \Delta t_k$ is the frequency term, $\mu_t$ controls the bandwidth of the phase update, and $\mu_f$ determines the bandwidth of the frequency-offset update.

In preferred embodiments, the number of possible phases per bit time that could be selected by the timing loop is 64 for the 4T system. In most conditions, jitter will cause the timing loop to dither between two or three sampling positions. With a resolution of 16 sampling positions per bit time, signal-to-noise degradation is minimized.

Because the feedback equalizer taps $h_1, \ldots, h_4$ and ideal signal level $h_0$ are determined adaptively, an initialization sequence is required. While there is no requirement for any particular data pattern to be used for initialization, the sequence that is used must be spectrally rich such as a pseudo-random bit sequence. During initialization, the timing and signal level loops are activated first with the feedback equalization loop frozen. The feedback equalizer adaptation loop is then enabled and all of the loops are allowed to settle. The entire process will be completed within a maximum of few hundred thousand bit times depending on the loop bandwidth settings.

The present invention thus provides a robust adaptive decision feedback equalizer that is capable of operating at high frequencies, such as in the range of 4.8 to 6.4 Gbps. By sampling bits in parallel modules at lower speeds, post-cursive ISI can be minimized based on actual subsequent bits. Thus, each module can view later bit values and minimize post-cursive ISI in a present bit. This offers significant advantage over prior systems that interpreted post-cursive ISI on the basis of prior bits, rather than subsequent bits.

Pre-calculation of filter coefficients permits rapid generation of a plurality of correction signals and generation of plural data slices with selection of data values being made based on the subsequent bit. Consequently, the system operates well at high frequencies.

While the invention is described employing the same number of taps in the decision feedback equalizers as there are phases of the clock, the number of clock phases and modules may be greater than the number of taps, in which case the taps of each module receive less than all of the outputs of the next modules.

Although the present invention has been described with reference to preferred embodiments, workers skilled in the art will recognize that changes may be made in form and detail without departing from the spirit and scope of the invention.

What is claimed is:

1. A data communication apparatus comprising:
    a transmitter capable of transmitting data in the form of a data signal representing a string of binary data bits, the data signal having at least two distinct amplitudes, the transmitter having a programmable feed-forward equalizer for minimizing pre-cursor inter-symbol interference in the data signal;
    a data channel coupled to the transmitter to transmit the data signal; and
    a receiver coupled to the data channel to receive the data signal, the receiver comprising:
        a plurality of modules, each module coupled to the data channel to receive the data signal, each module having a respective multi-phase adaptive decision feedback equalizer responsive to an output signal from a plurality of the modules that includes at least one other of the modules to modify the received signal based on the output signals of the plurality of the modules to minimize post-cursor inter-symbol interference in a current data bit of the received signal based on values of subsequent data bits,
        a processor responsive to output signals from each of the plurality of modules to generate a plurality of coefficient values,
    each adaptive decision feedback equalizer further comprises:
        a plurality of taps each responsive to a respective output signal from one of the modules and a respective coefficient value to generate a respective correction signal, and
        a summing device for summing the plurality of correction signals and the data signal.

2. The apparatus of claim 1, wherein the number of taps is based on a number of bits causing post-cursor inter-symbol interference in a data bit in the string.

3. The apparatus of claim 1, wherein each module further comprises:
    a data slicer responsive to the modified data signal and a target value to sample a value of a bit, and
    an analog-to-digital converter responsive to the sampled bit values to provide the output signal from the module.

4. The apparatus of claim 3, wherein the plurality of taps are arranged in pairs to generate respective first and second correction signals based on a respective filter coefficient and the output signal from a respective module, and wherein the summing device comprises a first summing device providing a first modified data signal based on the received data signal and the first correction signal and a second summing device providing a second modified data signal based on the received data signal and the second correction signal, the data slicer further comprises:
    a plurality of pairs of data slicers, each pair being responsive to a respective target value to sample the respective first and second modified data signals,
    a selector responsive to an output from another module for selecting samples of one of the first and second modified data signals.

5. The apparatus of claim 3, further comprising:
    a multi-phase clock responsive to the output signals from each of the plurality of modules to generate a plurality of clock signals having different phases,
    the data slicers of each module being responsive to a clock signal having first phase to sample a bit value and the analog-to-digital converter being responsive to a clock signal having a second phase, different from the first phase, to clear the sampled value from the converter, the first phase for each module being different from the first phase for each other module.

6. A data communication apparatus comprising:
a transmitter capable of transmitting data in the form of a data signal representing a string of binary data bits, the data signal having at least two distinct amplitudes, the transmitter having a programmable feed-forward equalizer for minimizing pre-cursor inter-symbol interference in the data signal;
a data channel coupled to the transmitter to transmit the data signal; and
a receiver coupled to the data channel to receive the data signal, the receiver comprising a plurality of modules, each module coupled to the data channel to receive the data signal, each module comprising:
  a respective multi-phase adaptive decision feedback equalizer responsive to an output signal from a plurality of the modules that includes at least one other of the modules to modify the received signal based on the output signals of the plurality of the modules to minimize post-cursor inter-symbol interference in a current data bit of the received signal based on values of subsequent data bits,
  a data slicer responsive to the modified data signal and a target value to sample a value of a bit, and
  an analog-to-digital converter responsive to the sampled bit values to provide the output signal from the module,
the receiver further comprising a multi-phase clock responsive to the output signals from each of the plurality of modules to generate a plurality of clock signals having different phases,
the data slicers of each module being responsive to a clock signal having a first phase to sample a bit value and the analog-to-digital converter being responsive to a clock signal having a second phase, different from the first phase, to clear the sampled value from the converter, the first phase for each module being different from the first phase for each other module.

7. A data communication apparatus comprising:
a transmitter capable of transmitting data in the form of a data signal representing a string of binary data bits, the data signal having at least two distinct amplitudes, the transmitter having a programmable feed-forward equalizer for minimizing pre-cursor inter-symbol interference in the data signal;
a data channel coupled to the transmitter to transmit the data signal; and
a receiver coupled to the data channel to receive the data signal, the receiver comprising:
  a plurality of modules, each module coupled to the data channel to receive the data signal, each module having a respective multi-phase adaptive decision feedback equalizer responsive to an output signal from a plurality of the modules that includes at least one other of the modules to modify the received signal based on the output signals of the plurality of the modules to minimize post-cursor inter-symbol interference in a current data bit of the received signal based on values of subsequent data bits,
  a processor responsive to output signals from each module for calculating filter coefficients,
  each adaptive decision feedback equalizer being responsive to output signals from a plurality of modules and the calculated filter coefficients to modify the received data signal to provide first and second modified data signals, and
  a selector responsive to the first and second modified data signals and the output signal from a different module to select one of the first and second modified data signals.

8. A printed circuit board or integrated circuit chip containing:
a first circuit capable of transmitting data in the form of a data signal representing a string of binary bits, the data signal having at least two distinct amplitudes;
a programmable feed-forward equalizer coupled to the first circuit to minimize pre-cursor inter-symbol interference in the data signal;
a data channel coupled to the feed-forward equalizer to transmit the data signal;
a utilization circuit coupled to the data channel to receive the data signal, the utilization circuit comprising:
  a plurality of modules, each module coupled to the data channel to receive the data signal,
  a respective multi-phase adaptive decision feedback equalizer in each module being responsive to an output signal from a plurality of the modules that includes at least one other module, each decision feedback equalizer modifying the data signal based on the output signals of the plurality of the modules to minimize post-cursor inter-symbol interference in a current data bit of the received data signal based on values of subsequent data bits,
  a processor responsive to output signals from each of the plurality of modules to generate a plurality of coefficient values,
wherein each adaptive decision feedback equalizer further comprises:
  a plurality of taps each responsive to a respective output signal from one of the modules and a respective coefficient value to generate a respective correction signal, and
  a summing device for summing the plurality of correction signals and the data signal.

9. The apparatus of claim 8, wherein each module further comprises:
a data slicer responsive to the modified data signal and a target value to sample a value of a bit, and
an analog-to-digital converter responsive to the sampled bit values to provide the output signal from the module.

10. The apparatus of claim 9, wherein the plurality of taps are arranged in pairs to generate respective first and second correction signals based on a respective filter coefficient and the output signal from a respective module, and wherein the summing device comprises a first summing device providing a first modified data signal based on the received data signal and the first correction signal and a second summing device providing a second modified data signal based on the received data signal and the second correction signal, the data slicer further comprises:
a plurality of pairs of data slicers, each pair being responsive to a respective target value to sample the respective first and second modified data signals,
a selector responsive to an output from another module for selecting samples of bit values from respective ones of the pairs of data slicers.

11. The apparatus of claim 9, further comprising:

a multi-phase clock responsive to the output signals from each of the plurality of modules to generate a plurality of clock signals having different phases, the data slicers of each module being responsive to a clock signal having first phase to sample a bit value and the analog-to-digital converter being responsive to a clock signal having a second phase, different from the first phase, to clear the sampled value from the converter, the first phase for each module being different from the first phase for each other module.

* * * * *